United States Patent [19]

Xue et al.

[11] Patent Number: 5,341,174
[45] Date of Patent: Aug. 23, 1994

[54] MOTION COMPENSATED RESOLUTION CONVERSION SYSTEM

[75] Inventors: Kefu Xue, Beavercreek; Ann J. Winans, Dayton; Eric Walowit, Springboro, all of Ohio

[73] Assignee: Wright State University, Dayton, Ohio

[21] Appl. No.: 930,772

[22] Filed: Aug. 17, 1992

[51] Int. Cl.$^5$ .............................................. H04N 5/92
[52] U.S. Cl. ...................................... 348/576; 348/715
[58] Field of Search ................ 358/140, 105, 166, 167, 358/11, 36, 37, 455, 479, 448; H04N 7/18, 5/92

[56] References Cited

U.S. PATENT DOCUMENTS

| | | | |
|---|---|---|---|
| 4,280,144 | 7/1981 | Bacon | 358/455 |
| 4,598,309 | 7/1986 | Casey | 358/11 |
| 4,639,783 | 1/1987 | Fling | 358/166 |
| 4,639,784 | 1/1987 | Fling | 358/167 |
| 4,720,745 | 1/1988 | DeForest et al. | 358/166 |
| 4,783,840 | 11/1988 | Song | 382/54 |
| 4,789,933 | 12/1988 | Chen et al. | 364/413.13 |
| 4,847,909 | 7/1989 | Shibata | 382/6 |
| 4,849,914 | 7/1989 | Medioni et al. | 358/456 |
| 4,860,104 | 8/1989 | Katsuyama | 358/167 |
| 4,862,283 | 8/1989 | Smith | 358/443 |
| 4,924,522 | 5/1990 | Bray et al. | 382/56 |
| 4,941,190 | 7/1990 | Joyce | 382/54 |
| 4,965,666 | 10/1990 | Haghiri | 358/105 |
| 4,967,271 | 10/1990 | Campbell et al. | 358/105 |
| 4,998,215 | 3/1991 | Black et al. | 358/296 |
| 5,131,057 | 7/1992 | Walouit et al. | 382/41 |
| 5,191,413 | 3/1993 | Edgar | 358/105 |
| 5,233,421 | 8/1993 | Christopher | 358/140 |

OTHER PUBLICATIONS

A. N. Netravali and J. D. Robbins, "Motion–Compensated Television Coding: Part 1, " The Bell System Technical Journal, vol. 58, Mar. 1979, pp. 631–670.

D. R. Walker and K. R. Rao, "Improved Pel–Recursive Motion Compensation," IEEE Transactions on Communications, vol. COM-32, No. 10, Oct. 1984, pp. 1128–1134.

K. Xue et al, "Spatial Domain Algorithm for Video-to-printing Image Resolution Conversion," Proceedings of the SPIE/SPSE Symposium on Electronic Imaging: Sci. and Tech., Feb. 1990 pp. 215–224.

Smith & Davis, "A New Algorithm for Edge Detection," Jun. 10, 1974, pp. 55–61.

Miyake et al, "A New Interpolation Algorithm of Television Pictures for Compact Printing System" SPSE's 40th Annual Conference and Symposium on Hybrid Imaging Systems, pp. 17–20 (1987).

Tzou et al., "Subjectively Adapted Interpolation" Electronic Imaging '86, pp. 144–148 (1986).

Pokorny et al. "Computer Graphics: The Principles Behind Art and Science" pp. 260–262.

Marr, Vision, pp. 54–61.

Kefu Xue et al, "An Edge–Restricted Spatial Interpolation Algorithm", Journal of Electronic Imaging, Apr. 1992, pp. 152–161.

Primary Examiner—Howard W. Britton
Attorney, Agent, or Firm—Killworth, Gottman, Hagan & Schaeff

[57] ABSTRACT

A process is provided for creating a high resolution copy of a target video frame selected from a sequence of video frames, wherein each video frame comprises two interlaced fields. The process comprises the steps of: selecting a single field of the target video frame for resolution enhancement; defining a reference target frame having pixel values assigned from the selected single field; defining an enlarged target frame having pixel locations corresponding to the high resolution copy; assigning pixel values from the selected single field to pixel locations in the enlarged target frame which correspond to pixel locations in the selected single field; assigning estimated pixel values to unassigned pixel locations in the reference target frame; selecting a field from one of the video frames in the sequence of video frames which was not chosen as the selected single field as a first object field; estimating motion vectors extending from the reference target frame to pixels in the first object field; identifying accurate motion vectors; assigning the value of a respective pixel for each motion vector identified as accurate to an enlarged target frame pixel location corresponding to an origination point of the motion vector unless the enlarged target frame pixel location was previously assigned a pixel value; and printing the enlarged target frame. Further provided is printing apparatus for creating a high resolution copy of lower resolution video information.

23 Claims, 6 Drawing Sheets

MOTION COMPENSATED RESOLUTION CONVERSION SYSTEM

BACKGROUND OF THE INVENTION

The present invention relates to a process and apparatus for improving low spatial resolution of video information generated by a video source to allow a high resolution hard copy of the video information to be made by a video printing device and, more particularly, to a process and apparatus for increasing the resolution of a target video frame in a video frame sequence by capturing information from pixels in earlier and/or later video frames and combining the captured information with information from the target frame to produce an enlarged target frame suitable for printing a high resolution hard copy.

It is oftentimes desirable to create a hard copy image of video information generated by a video source, such as a video cassette recorder or a video camera. Video printers are known which are capable of accepting and creating hard copy images of video information generated by such video sources. However, because video sources typically have low spatial resolution as compared with the resolution of quality video printers, the resolution and appearance of printed hard copy images of video information generated by video sources is of low quality.

Accordingly, there is a need for a process for improving the low spatial resolution of video information generated by video sources to allow high resolution hard copy images to be made of such information by video printing devices.

SUMMARY OF THE INVENTION

This need is met by the present invention wherein a process is provided for improving the low spatial resolution of video information generated by video sources to allow higher resolution copies to be made of such information by video printing devices. In accordance with the process of the present invention, the resolution of a target video frame selected from a sequence of video frames is improved by taking additional information from pixels of earlier and/or later frames and incorporating the additional information into the target frame to form an enlarged target frame. Further provided in accordance with the present invention is printing apparatus for creating a high resolution copy of lower resolution video information.

In accordance with a first aspect of the present invention, a process is provided for creating a high resolution copy of a target video frame selected from a sequence of video frames. The process comprises the steps of: defining an enlarged target frame having pixel locations corresponding to the high resolution copy; assigning pixel values from the target video frame to pixel locations in the enlarged target frame which correspond to pixel locations in the target video frame; selecting one of the sequence of video frames which was not selected as the target video frame as a first object video frame for use in enhancing the enlarged target frame; estimating motion vectors extending from the target video frame to pixels in the first object video frame; identifying accurate motion vectors; for each motion vector identified as being accurate, assigning the value of its respective pixel to an enlarged target frame pixel location corresponding to an origination point of the motion vector unless the enlarged target frame pixel location was previously assigned a pixel value; and, printing the enlarged target frame.

The process preferably further comprises the steps of: selecting another of the sequence of video frames which was not selected as the target video frame or the first object video frame as a second object video frame for use in enhancing the enlarged target frame; estimating further motion vectors extending from the reference target frame to pixels in the second object frame; identifying accurate further motion vectors; and, for each further motion vector identified as being accurate, assigning the value of its respective pixel to an additional enlarged target frame pixel location corresponding to an origination point of the further motion vector unless the additional enlarged target frame pixel location was previously assigned a pixel value.

The first object video frame either precedes or follows the target video frame in the sequence of video frames. The first object video frame may be temporally closer to the target video frame than the second object video frame. Alternatively, the first object video frame may be positioned adjacent to a first side of the target video frame while the second object video frame is positioned adjacent to a second side of the target video frame.

Preferably, before the enlarged target frame is printed, a spatial, edge enhancement technique is performed in order to assign values to remaining unassigned pixel locations in the enlarged target frame.

In accordance with a second aspect of the present invention, a process is provided for creating a high resolution copy of a target video frame selected from a sequence of video frames, wherein each video frame includes an odd field having pixel values in odd-numbered lines and an even field having pixel values in even-numbered lines. The process comprises the steps of: selecting a single field of the target video frame for resolution enhancement; defining a reference target frame having pixel values assigned from the selected single field; defining an enlarged target frame having pixel locations corresponding to the high resolution copy; assigning pixel values from the selected single field to pixel locations in the enlarged target frame which correspond to pixel locations in the selected single field; assigning estimated pixel values to unassigned pixel locations in the reference target frame; selecting a field from one of the video frames in the sequence of video frames which was not chosen as the selected single field as a first object field; estimating motion vectors extending from the reference target frame to pixels in the first object field; identifying accurate motion vectors; assigning the value of a respective pixel for each motion vector identified as accurate to an enlarged target frame pixel location corresponding to an origination point of the motion vector unless the enlarged target frame pixel location was previously assigned a pixel value; and printing the enlarged target frame.

The process further comprises the step of: assigning the value of a respective pixel for each motion vector determined to be accurate and having an origination point positioned at the pixel location of a previously estimated pixel value to a reference target frame pixel location which is the pixel location of the origination point unless the reference target frame pixel location was previously assigned a pixel value from a respective pixel for an earlier motion vector determined to be accurate.

The process additionally comprises the steps of: (a) selecting another object field from one of the video frames in the sequence of video frames which was not previously selected; (b) estimating further motion vectors extending from the reference target frame to pixels in the another object field; (c) identifying accurate further motion vectors; and (d) for each further motion vector identified as being accurate, assigning the value of its respective pixel to an additional enlarged target frame pixel location corresponding to an origination point of the further motion vector unless the additional enlarged target frame pixel location was previously assigned a pixel value. Steps (a) through (d) are repeatedly performed until a predetermined number of fields from the video frames in the sequence have been used to enhance the enlarged target frame.

Preferably, before the enlarged target frame is printed, a spatial, edge enhancement technique is performed in order to assign values to remaining unassigned pixel locations in the enlarged target frame.

In accordance with a third aspect of the present invention, printing apparatus is provided for creating a high resolution copy of lower resolution video information. The apparatus includes monitoring means for viewing a sequence of video frames and selector means for permitting an operator to select a target video frame from the sequence of video frames for resolution enhancement and subsequent printing. Processor means is provided to define an enlarged target frame having pixel locations corresponding to the high resolution copy, for assigning pixel values from the target video frame to pixel locations in the enlarged target frame which correspond to pixel locations in the target video frame, for selecting one of the sequence of video frames which was not selected as the target video frame as an object video frame for use in enhancing the enlarged target frame, for estimating motion vectors extending from the target video frame to pixels in the object video frame, for identifying accurate motion vectors, and for assigning for each motion vector identified as being accurate its respective pixel value to an enlarged target frame pixel location corresponding to an origination point of the motion vector unless the enlarged target frame pixel location was previously assigned a pixel value. Printer means is included for receiving pixel values for the enlarged target frame from the processor means and for generating a printed copy of the enlarged target frame.

Accordingly, it is an object of the present invention to provide a process for improving the low spatial resolution of video information generated by video sources to allow higher resolution copies to be made from such information by video printing devices. It is a further object of the present invention to provide a process for creating a high resolution copy of a target video frame selected from a sequence of video frames. It is an additional object of the present invention to provide a process for improving the resolution of a target video frame selected from a sequence of video frames by capturing information from pixels in earlier and/or later frames and combining the information from those pixels with information from the target frame to produce an enlarged target frame suitable for producing a high resolution copy. It is yet another object of the present invention to provide printing apparatus for creating a high resolution copy of lower resolution video information.

These and other objects and advantages of the present invention will be apparent from the following description, the accompanying drawings, and the appended claims.

DETAILED DESCRIPTION OF THE INVENTION

The resolution of a video image is inherently limited by the number of photo-cells in a camera that captures the image from a scene. If a sequence of image frames is captured from a scene involving motion, then information that was not sampled for one frame, due to the coarse spatial arrangement of the photo-cells, may be sampled for earlier and/or later frames in the sequence. The process and apparatus of the present invention enhances the resolution of a target video frame by taking information from pixels contained in earlier and/or later frames and combining that information with information contained in the target frame to produce an enlarged target frame suitable for preparing a hard copy.

Figure 1:
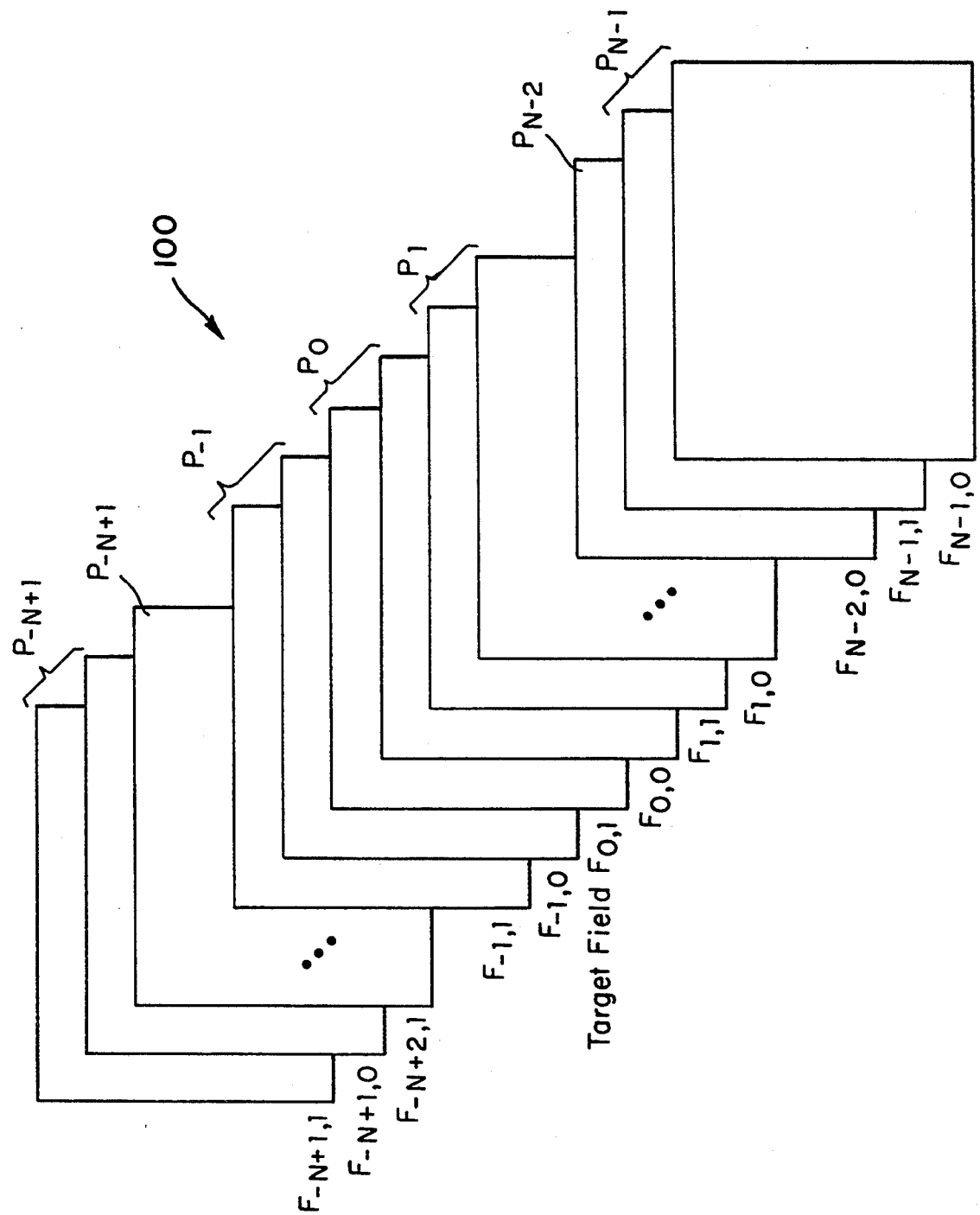
FIG. 1 is a schematic illustration of a sequence of N video frames including a target video frame $P_0$, the resolution of which is to be improved by the process of the present invention.

Referring now to FIG. 1, a sequence of N video image frames 100 is shown, wherein frame $P_0$ has arbitrarily been chosen as a "target" frame for resolution enhancement and subsequent printing.

Each frame of the sequence 100 is denoted by the following:

$$\{P_k(i,j): i=0,\ldots,N_1-1; j=0,\ldots, N_2-1\}$$

wherein:
  k is the frame number of the frame sequence;
  i and j are the vertical and horizontal spatial coordinates, respectively, of each frame;
  $N_1$ is the vertical dimension of each frame, i.e., the number of vertical pixels in each frame; and,
  $N_2$ is the horizontal dimension of each frame, i.e., the number of horizontal pixels in each frame.

Each video image frame $P_k$ in the illustrated embodiment comprises two interlaced fields, an "odd" field and an "even" field. The field which includes pixels in the odd-numbered lines (i=1, 3, 5, ...) of the kth frame is designated the "odd" field and is denoted as:

$$F_{k,f}(u,j) = \{P_k(i,j): i=1,3,5,\ldots; j=0,1,\ldots,N_2-1\}$$

wherein:
k is the frame number of the frame sequence;
f=1;
u=(i-f)/2; and
i and j are the vertical and horizontal spatial coordinates, respectively, of each frame.

The field which includes pixels in the even-numbered lines (i=0, 2, 4, ...) of the kth frame is designated the "even" field and is denoted as:

$$F_{k,f}(u,j) = \{P_k(i,j): i=0,2,4,\ldots; j=0,1,\ldots,N_2-1\}$$

wherein:
k is the frame number of the frame sequence;
f=0;
u=(i-f)/2; and
i and j are the vertical and horizontal spatial coordinates, respectively, of each frame.

A brief explanation now follows describing a process in accordance with the present invention for enhancing the resolution of the target video frame $P_0$ by taking information captured from earlier and/or later frames that actually belongs to the image represented by the target frame $P_0$ and adding that information to the information in the target frame $P_0$ to construct an enlarged target frame suitable for high resolution printing.

Initially, a "reference target" frame $P_t$ is created from an arbitrarily selected single field of the target frame $P_0$. For purposes of illustration only, the field having pixel values for the odd-numbered lines is selected. An enlarged target frame Q is also created having a spatial resolution which matches that of a high resolution printing device. Pixel values are assigned either directly from the selected single field or from the reference target frame $P_t$ to pixel locations in the enlarged target frame Q. Estimated pixel values are next assigned to the unassigned elements in the even rows of the reference target frame $P_t$. Thereafter, motion vectors which are indicative of the displacement of pixels between earlier and/or later frames and the reference target frame $P_t$ are estimated.

Based upon the estimated motion vectors, pixels in the earlier and/or later frames that actually belong to the image represented by the reference target frame $P_t$ are identified and their "sub-pixel" locations in the reference target frame $P_t$ are determined. Subject to an exception noted below, the identified pixels having a "sub-pixel" location on an element in an even-numbered row in the reference target frame $P_t$, are incorporated into the reference target frame $P_t$. Subject to other exceptions noted below, the identified pixels, including those which do not have a "sub-pixel" location on an element in an even-numbered row in the reference target frame $P_t$, are incorporated into the enlarged target frame Q. A high resolution hard copy image of the enlarged target frame Q is thereafter produced by a printer device.

Figure 2:
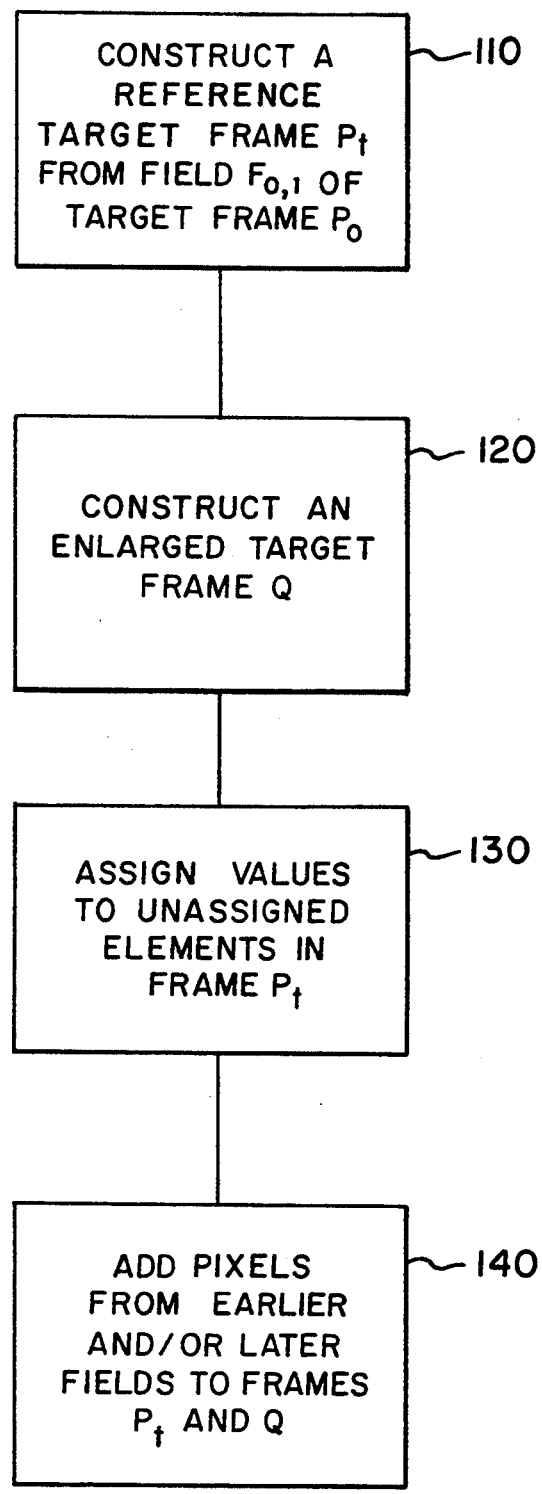
FIG. 2 shows in flow chart form the steps which are performed in accordance with the process of the present invention for increasing the spatial resolution of the target video frame $P_0$.

FIG. 2 shows in flow chart form the steps which are performed in accordance with the process of the present invention for increasing the spatial resolution of the target frame $P_0$.

The first step 110 involves constructing a "reference target" frame $P_t$. There is a minuscule time lapse between the sampling of an odd field and an even field of a given frame. Consequently, there is visible motion within each frame as well as between frames. In order to achieve a high resolution still image of the target frame $P_0$, one field of the target frame $P_0$ must be selected and the spatial resolution of that field improved. For purposes of illustration only, field $F_{0,1}$, the odd field, is selected as the one field for which the spatial resolution is improved. The reference target frame $P_t$ is initially constructed by assigning the video image pixel values from the selected field $F_{0,1}$ to corresponding elements in the odd-numbered lines in the reference target frame $P_t$. Elements or pixel locations in the even-numbered lines of the reference target frame $P_t$ are left unassigned.

In step 120, an enlarged target frame Q is constructed having a spatial resolution which matches that of a high resolution printer device. The enlarged target frame is constructed by expanding the video image pixel values in the reference target frame $P_t$ both horizontally and vertically. This is achieved by adding an appropriate number of ($M_1-1$) zeros in the vertical direction following each pixel value and adding an appropriate number of ($M_2-1$) zeros in the horizontal direction after each pixel value so that the spatial resolution of the enlarged target frame equals that of the printing device. The enlarged target frame is denoted by:

$$\{Q(r,s): r=0,\ldots,M_1N_1-1, s=0,\ldots,M_2N_2-1\}$$

wherein:
r and s are the vertical and horizontal spatial coordinates, respectively, of the frame;
$M_1N_1$ is the vertical dimension of the frame, i.e., the number of vertical pixels in the enlarged target frame.
$M_2N_2$ is the horizontal dimension of the frame, i.e., the number of horizontal pixels in the enlarged target frame.

It should be apparent that step 120 may precede step 110. In such a case, pixel values from field $F_{0,1}$ would be employed for constructing the enlarged target frame Q.

In step 130, estimated pixel values are assigned to the previously unassigned elements in the even rows of the reference target frame $P_t$. The video pixel values from the first odd-numbered line (i=1) are assigned to the elements in the first even-numbered line $P_t(0,j)$. Thus, $P_t(0,j) = P_t(1,j)$. For the second even-numbered line $P_t(2,j)$, linear interpolation is used to approximate video pixel values from video pixel values in lines $P_t(1,j)$ and $P_t(3,j)$ and those approximated video pixel values are assigned to the elements in line $P_t(2,j)$. As to the remaining even-numbered lines (i=4,6,8, ...), the elements in those lines are assigned values by performing one-dimensional cubic spline interpolation in the vertical (i) direction via the following equation:

$$P_t(i,j) = -\frac{1}{16} P_t(i-3,j) + \frac{9}{16}[P_t(i-1,j) + P_t(i+1,j)] - \frac{1}{16} P_t(i+3,j)$$

wherein:
i=4,6,8, ... ; and
j=0,1, ... ,$N_2-1$.

Figure 3:
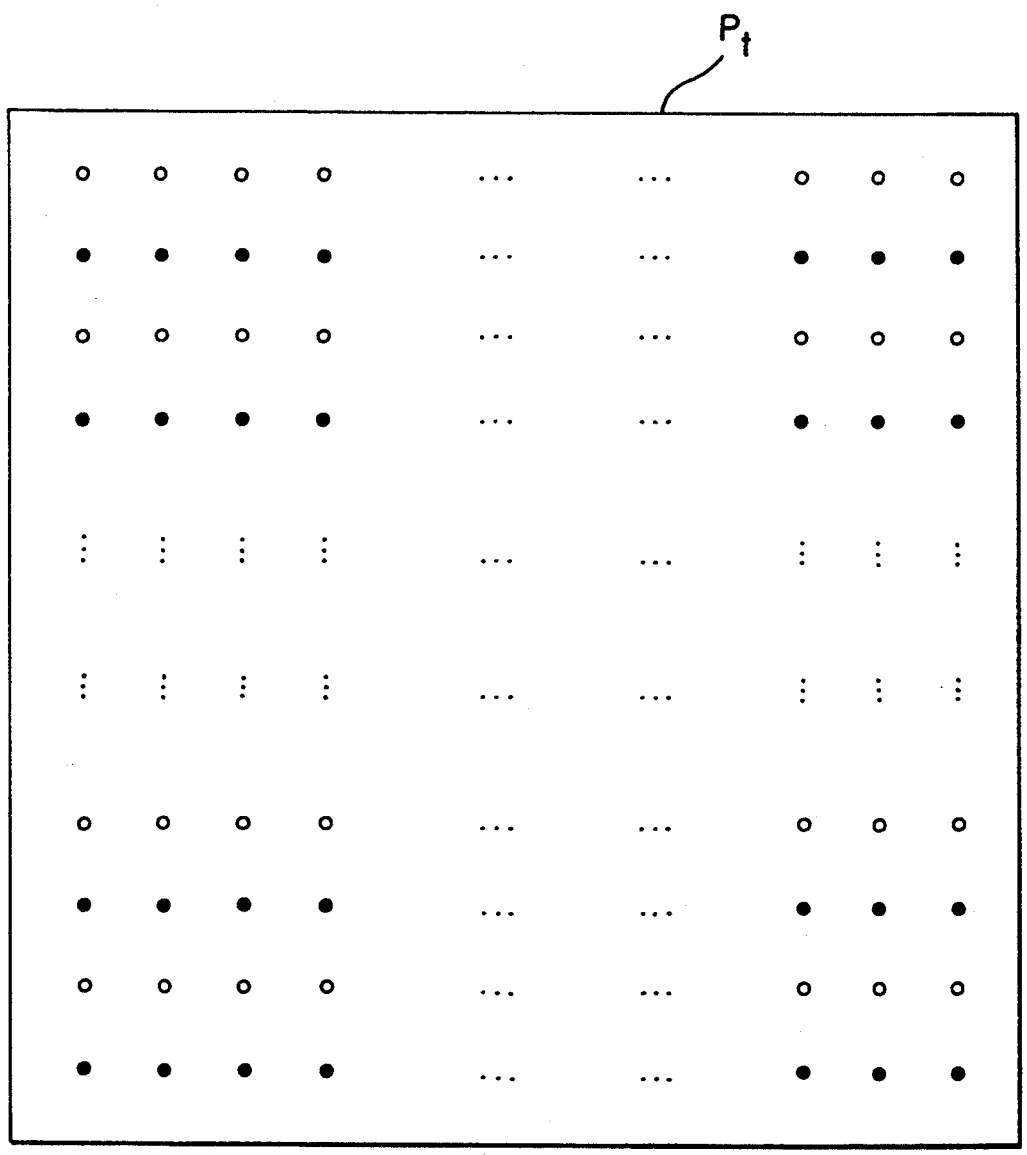
FIG. 3 is a schematic illustration of a reference target frame $P_t$ having estimated pixel values assigned to elements in even-numbered rows and pixel values derived from field $F_{0,1}$ assigned to elements in odd-numbered rows.

The reference target frame Pt, having estimated pixel values assigned to the elements in the even rows, is shown in FIG. 3. The video image pixel values, derived from field $F_{0,1}$ and located in the odd-numbered lines, are represented by "○"s, while the estimated pixel values in the even-numbered lines, are represented by "●"s.

In step 140, pixels in earlier and later fields $F_{k,f}$, i.e., fields other than field $F_{0,1}$, that include information belonging to the image represented by the reference target frame $P_t$, are identified and their "sub-pixel" locations in the reference target frame $P_t$ are determined. Subject to an exception noted below, the identified pixels having a "sub-pixel" location on an element in an even-numbered row in the reference target frame $P_t$ are incorporated into the reference target frame $P_t$. Subject to other exceptions noted below, the identified pixels, including those which do not have a "sub-pixel" location on an element in an even-numbered row in the reference target frame $P_t$, are incorporated into the enlarged target frame Q to enhance the resolution of that frame.

The process for identifying pixels in earlier and later fields $F_{k,f}$ that include information belonging to the image represented by the reference target frame $P_t$ and determining their "sub-pixel" locations in the reference target frame $P_t$ will now be described.

Initially, two-dimensional motion displacement vectors extending from the reference target frame $P_t$ to pixels in each remaining field $F_{k,f}$ of the sequence 100 are estimated. Preferably, vectors extending from the reference target field $P_t$ to fields temporally closest to the reference target field $P_t$ are estimated first. Consequently, vectors extending from the reference target field $P_t$ to either field $F_{0,0}$ or $F_{-1,0}$ are estimated first.

A two-dimensional motion displacement vector extending from the reference target frame $P_t$ to a pixel in a remaining field $F_{k,f}$ defines the displacement of the pixel in that field $F_{k,f}$ relative to the reference target frame $P_t$. This two-dimensional motion displacement vector is designated as follows:

$$D_{k,f}(u,j) = \begin{pmatrix} dy \\ dx \end{pmatrix}$$

wherein:
dy is the vertical displacement of the pixel; and
dx is the horizontal displacement of the pixel.

A displaced field difference value "$\Delta$", which is equal to the absolute value of the difference between a pixel value at location (u,j) in a remaining field $F_{k,f}$ and a pixel value located at a location (i-dy, j-dx) in the reference target frame $P_t$, is defined as follows:

$$\Delta(D_{k,f}(u,j)) = |F_{k,f}(u,j) - P_t(i-dy, j-dx)|, \quad (1)$$

If location (i−dy, j−dx) does not fall directly on a pixel location in the reference target frame $P_t$, i.e., it has rational rather than integer coordinates, a well-known bilinear interpolation technique is employed to determine the equivalent pixel value at $P_t(i-dy, j-dx)$.

The displaced field difference value "$\Delta$" equals zero only if vector $D_{k,f}(u,j)$ perfectly describes the motion of a pixel from a field $F_{k,f}$ to the reference target frame $P_t$.

A pixel recursive motion estimation technique is used to estimate the motion displacement vector $D_{k,f}(u,j)$ extending from the reference target frame $P_t$ to a pixel at location (u,j) in a remaining field $F_{k,f}$. The recursion formula employed is defined as follows:

$$D_{k,f}^l(u,j) = D_{k,f}^{l-1}(u,j) - \epsilon \Delta(D_{k,f}^{l-1}(u,j)) \vec{G}\{P_t(i - dy^{l-1}j - dx^{l-1})\}, \quad (2)$$

wherein:
$D_{k,f}^l(u,j)$ is the motion vector currently being estimated;
$D_{k,f}^{l-1}(u,j)$ is the motion vector estimated in the previous iteration;
$\Delta D_{k,f}^{l-1}(u,j)$ is the displaced field difference $\Delta$ for vector $D_{k,f}^{l-1}(u,j)$;
$\vec{G}\{P_t(i-dy^{l-1}, j-dx^{l-1})\}$ is a spatial intensity gradient of the reference target frame $P_t$ at location $(i-dy^{l-1}, j-dx^{l-1})$; and,
$\epsilon$ is a convergence coefficient, which controls the correction gain in each estimation iteration, and is defined as follows:

$$\epsilon = \frac{1}{2\vec{G}^T\{P_t(i - dy^{l-1}j - dx^{l-1})\}\vec{G}\{P_t(i - dy^{l-1}j - dx^{l-1})\}} \quad (3)$$

When the magnitude of spatial intensity gradient $2\vec{G}^T\{P_t\}\vec{G}\{P_t\}$ in equation (3) is large, an object edge may exist at location $(i-dy^{l-1}, j-dx^{l-1})$ in the reference target field $P_t$. Motion information near an object edge is important. Consequently, when $2\vec{G}^T\{P_t\}\vec{G}\{P_t\}$ is large, $\epsilon$ will be small and more iterations of equation (2) above will likely occur resulting in improved motion vector estimation accuracy. Conversely, when the magnitude of the spatial intensity gradient $2\vec{G}^T\{P_t\}\vec{G}\{P_t\}$ is small, a smooth area probably exists at location $(i-dy^{l-1}, j-dx^{l-1})$ in the reference target field $P_t$. As a result, $\epsilon$ will be large, which will likely reduce the number of iterations performed.

Before $D_{k,f}^l(u,j)$ is initially estimated using equation (2), vector $D^{l-1}(u,j)$ is set equal to an initialized vector $D_{k,f}^0(u,j)$. Vector $D_{k,f}^0(u,j)$ is initialized in the following manner.

It is assumed that the video sequence 100 contains motion and that this motion is continuous. Consequently, a value for a previously estimated motion vector extending from the reference target frame $P_t$ to a pixel in a remaining field $F_{k,f}$ in the sequence 100 can be used to initialize the initial vector $D_{k,f}^0(u,j)$ if that previously estimated motion vector was found to be accurate. The motion vector at neighboring pixel $D_{k,f}(u,j-1)$ is first considered. If that motion vector is marked "accurate," its value is assigned to $D_{k,f}^0(u,j)$. Otherwise, an attempt is made to initialize $D_{k,f}^0(u,j)$ with a motion vector from a temporally adjacent field $(D_{k,f-1}(u-1,j)$, $D_{k,f-1}(u+1,j)$, $D_{k-1,f}(u,j-1)$, or $D_{k-1,f}(u,j+1))$. If neither option is available, then the vector $D_{k,f}^0(u,j)$ is initialized with a null vector.

After vector $D_{k,f}^{l-1}(u,j)$ is set equal to vector $D_{k,f}^0(u,j)$, $\Delta D_{k,f}^{l-1}(u,j)$ is calculated via equation (1) based upon the initialized vector $D_{k,f}^{l-1}(u,j)$. $\Delta$ and $\vec{G}\{P_t\}$ are then determined, and $D_{k,f}^l(u,j)$ is estimated from equation (2).

The displaced field difference $\Delta$ for estimated vector $D_{k,f}^l(u,j)$ is next calculated using equation (1). If $\Delta_{k,f} D_{k,f}^l(u,j)$ is less than a predetermined threshold value for pixel value differences, then vector $D_{k,f}^l(u,j)$ is considered "accurate." If, on the other hand, $\Delta D_{k,f}^l(u,j)$ is greater than the threshold value, then vector $D_{k,f}^l(u,j)$ is considered "inaccurate." The threshold value is set to a numerical quantity which allows a desired motion vector estimation accuracy to be achieved.

If vector $D_{k,f}(u,j)$ is found to be inaccurate, equation (2) is used to recursively update $D_{k,f}(u,j)$, where $1=2, \ldots, L$, so that $\Delta$ is minimized. The total number of iterations performed at a pixel location $(u,j)$ in field $F_{k,f}$ is limited to L iterations, to prevent an excessive number of iterations from being performed.

After each iteration, the displaced field difference $\Delta$ for updated vector $D_{k,f}(u,j)$ is calculated using equation (1) above. If $\Delta D_{k,f}(u,j)$ is less than the predetermined threshold value, then the updated vector $D_{k,f}(u,j)$ is considered "accurate" and no further iterations occur. If, on the other hand, $\Delta D_{k,f}(u,j)$ is greater than the threshold value, then updated vector $D_{k,f}(u,j)$ is considered "inaccurate" and further iterations are performed using equation (2) unless $l>L$. If L iterations have occurred and $\Delta D_{k,f}(u,j)$ remains greater than the threshold value, no further iterations are performed and the last estimated motion vector $D^L_{k,f}(u,j)$ is marked "inaccurate."

If vector $D_{k,f}(u,j)$ is considered "accurate" for a pixel at location $(u,j)$ in field $F_{k,f}$, the pixel value at that location $(u,j)$ is assigned to the origination point $(i-dy, j-dx)$ of the vector $D_{k,f}(u,j)$ in the reference target field $P_t$ if: (1) the origination point falls on a pixel location in an even-numbered row of the reference target frame $P_t$, and (2) the location $(i-dy, j-dx)$ in the reference target frame $P_t$ was not previously assigned a value from an earlier motion vector determined to be accurate. That is, if the origination point $(i-dy, j-dx)$ of the vector $D_{k,f}(u,j)$ falls on a pixel location having an assigned interpolated pixel value, the interpolated pixel value at that location is replaced with the value from location $(u,j)$ in field $F_{k,f}$ if vector $D_{k,f}(u,j)$ is considered accurate.

The value of the respective pixel for vector $D_{k,f}(u,j)$, assuming the vector is considered "accurate," is assigned to a corresponding location $Q(r,s)$ in the enlarged target frame Q unless location $Q(r,s)$ has previously been assigned a value from the reference target frame $P_t$ or from a field temporally closer to field $F_{0,1}$.

Location $Q(r,s)$ corresponds to the origination point of the vector $D_{k,f}(u,j)$ in the reference target field $P_t$ and is determined from the following equations:

$$r = M_1 i - \text{round}[M_1 dy]$$

$$s = M_2 j - \text{round}[M_2 dx]$$

wherein:
round[$M_1 dy$] is equal to $M_1 dy$ rounded off to the nearest integer value in frame Q; and
round[$M_2 dx$] is equal to $M_2 dx$ rounded off to the nearest integer value in frame Q.

The above described motion estimation and pixel placement process is recursively repeated in both spatial (i,j) and temporal (k) domains (i.e., for every pixel in each field $F_{k,f}$) until fields $F_{N-1,0}$ and $F_{-N+1,1}$ have been completed. It should be apparent that the number of fields employed during the above-described motion estimation and pixel placement process can vary depending upon such things as desired video enhancement and processing time.

Figure 4:
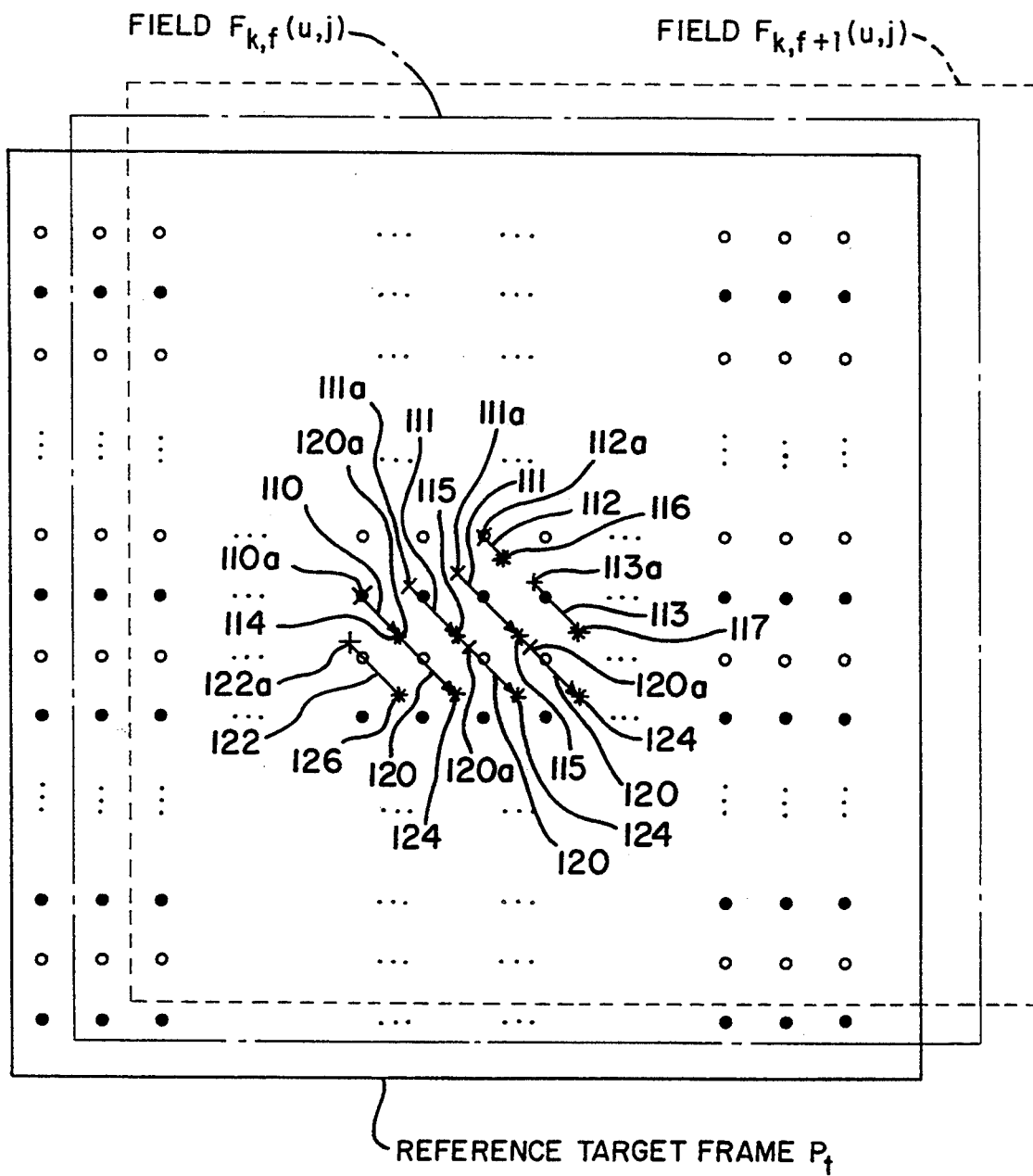
FIG. 4 is a schematic illustration of first and second object fields superimposed over the reference target frame $P_t$ and illustrating estimated motion vectors extending from the reference target frame $P_t$ to pixels in the first and second object fields.
Figure 5:
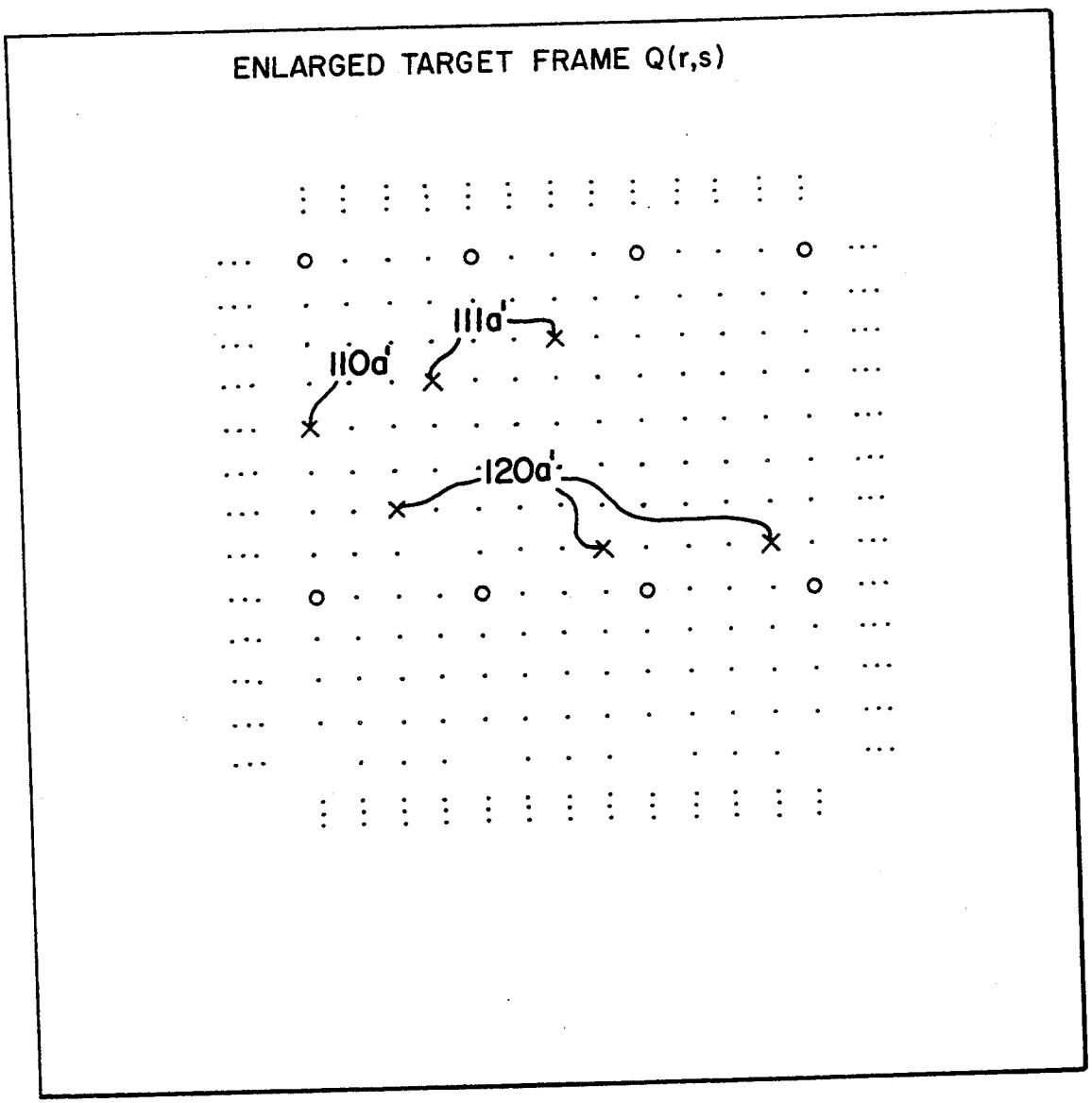
FIG. 5 is a schematic illustration of an enlarged target frame having pixel values assigned to locations which correspond to the origination points of the estimated motion vectors shown in FIG. 4; and, FIG. 6 is a schematic block diagram of a video printing apparatus of the present invention.

To illustrate the above described motion estimation and pixel placement process, reference is now made to FIGS. 4 and 5. Initially, motion vectors 110-113 extending from the reference target frame $P_t$ to pixels 114-117 in a first object field $F_{k,f}$ are estimated. Thereafter, motion vectors 120 and 122 extending from the reference target frame $P_t$ to pixels 124 and 126 in a second object field $F_{k,f+1}$ are estimated.

As shown in FIG. 4, the motion vectors 110, 111, 112, and 113 extend from locations 110a, 111a, 112a and 113a in the reference target frame $P_t$ to the pixels 114, 115, 116 and 117 in field $F_{k,f}$. Likewise, the motion vectors 120 and 122 extend from locations 120a and 122a in the reference target frame $P_t$ to the pixels 124 and 126 in field $F_{k,f+1}$. The motion vectors 110, 111, 112 and 120 have displaced field difference values $\Delta$ less than that of a predetermined threshold value and, hence, are considered "accurate." Remaining motion vectors 113 and 122 have displaced field difference values $\Delta$ greater than that of the threshold value and, hence, are considered "inaccurate."

As shown in FIG. 4, the origination point for motion vector 110 falls on an element in an even-numbered row of the reference target frame $P_t$. Consequently, the value of pixel 114 is incorporated into the reference target frame $P_t$ at location 110a. Since the remaining "accurate" vectors 111, 112 and 120 do not extend from an element in an even-numbered row in the reference target frame $P_t$, their corresponding pixel values are not incorporated into the reference target frame $P_t$.

As illustrated in FIG. 4, motion vector 112 extends from a point (represented by a "○") in the reference target frame $P_t$ which was previously assigned a value from field $F_{0,1}$. Consequently, the value of pixel 116 is not assigned to the enlarged target frame Q. However, values from pixels 114, 115 and 124, which are associated with "accurate" vectors 110, 111 and 120, are assigned to elements at locations 110a', 111a' and 120a' in the enlarged target frame Q, which locations correspond to locations 110a, 111a and 120a in the reference target frame $P_t$. Values from pixels 116 and 126, which are associated with "inaccurate" vectors 113 and 122, are not assigned to elements in the enlarged target frame Q.

The number of new pixels added to an enlarged target frame $Q(r,s)$ varies with the amount of motion involved in a scene as well as with the contrast of the images in the scene. If a sequence of video frames is captured from a scene involving a large amount of motion, and the scene has many high contrast details, then a great number of new pixels can be added via the motion estimation and pixel placement process of the present invention.

After the above described motion estimation and pixel placement process has been repeated for each field $F_{k,f}$ in the sequence 100, a spatial, edge enhancement technique is performed in order to assign values to the remaining pixel locations in the enlarged target frame Q. The spatial, edge enhancement process is described in U.S. Pat. No. 5,131,057, the disclosure of which is incorporated herein by reference. Thereafter, the enlarged target frame Q is printed.

Figure 6:
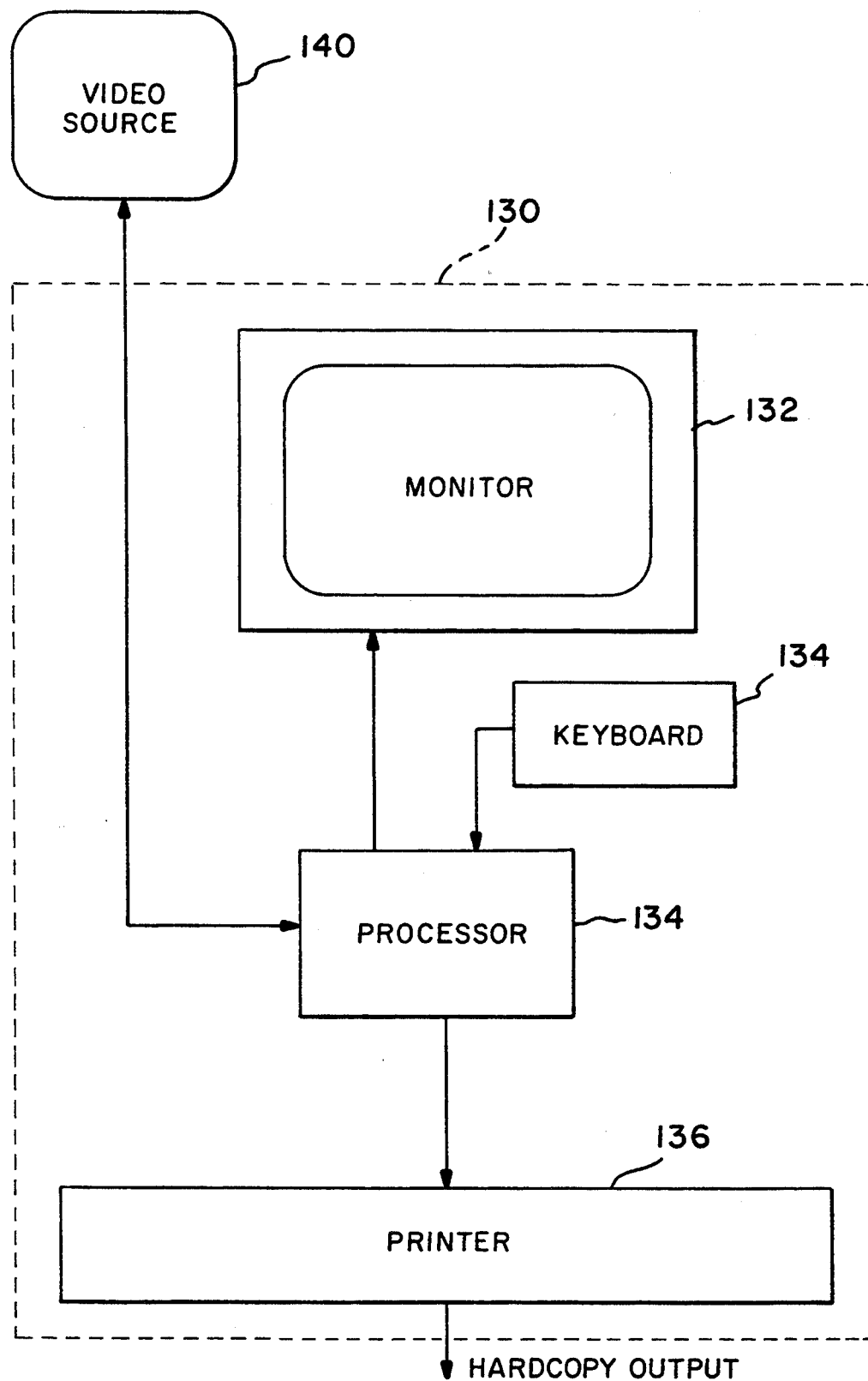

Video printing apparatus 130 in accordance with the present invention is shown schematically in FIG. 6. The apparatus 130 receives video information from a video source 140, such as a video cassette recorder or a video camera, implements the motion estimation and pixel placement process discussed above as well as the spatial, edge enhancement process described in U.S. Pat. No. 5,131,057, and prints a hard copy image of the enlarged target frame Q.

The printing apparatus 130 includes a monitor 132 for viewing the sequence of video frames 100. The desired target frame $P_0$ as well as the desired field of the target frame $P_0$ from which the reference frame $P_r$ is created is selected via a keyboard 134. A processor 134 is provided for implementing the motion estimation and pixel placement process as well as the spatial, edge enhancement process, thereby creating the enlarged target frame Q having a spatial resolution greater than that of the target frame $P_0$. A high resolution printer 136, which also forms part of the printing apparatus 130 receives pixel values for the enlarged target frame Q from the processor 134 and creates a hard copy recording of the same.

Having described the invention in detail and by reference to a preferred embodiment thereof, it will be apparent that modifications and variations are possible without departing from the scope of the invention defined in the appended claims.

What is claimed is:

1. A process for creating a high resolution copy of a target video frame selected from a sequence of video frames comprising the steps of:
   defining an enlarged target frame having pixel locations corresponding to said high resolution copy;
   assigning pixel values from said target video frame to pixel locations in said enlarged target frame which correspond to pixel locations in said target video frame;
   selecting one of said sequence of video frames which was not selected as said target video frame as a first object video frame for use in enhancing said enlarged target frame;
   estimating motion vectors extending from said target video frame to pixels in said first object video frame;
   identifying accurate motion vectors;
   for each motion vector identified as being accurate, assigning the value of its respective pixel to an enlarged target frame pixel location corresponding to an origination point of said motion vector unless said enlarged target frame pixel location was previously assigned a pixel value; and
   printing said enlarged target frame.

2. A process for creating a high resolution copy of a target video frame selected from a sequence of video frames as set forth in claim 1, wherein said first object video frame precedes said target video frame in said sequence of video frames.

3. A process for creating a high resolution copy of a target video frame selected from a sequence of video frames as set forth in claim 1, wherein said first object video frame follows said target video frame in said sequence of video frames.

4. A process for creating a high resolution copy of a target video frame selected from a sequence of video frames as set forth in claim 1, wherein motion vectors are estimated for substantially all pixels in said first object video frame.

5. A process for creating a high resolution copy of a target video frame selected from a sequence of video frames as set forth in claim 1, further comprising the step of performing spatial edge enhancement to assign pixel values to unassigned pixel locations in said enlarged target frame prior to performing the step of printing said enlarged target frame.

6. A process for creating a high resolution copy of a target video frame selected from a sequence of video frames as set forth in claim 1, further comprising the steps of:
   selecting another of said sequence of video frames which was not selected as said target video frame or said first object frame as a second object video frame for use in enhancing said enlarged target frame;
   estimating further motion vectors extending from said reference target frame to pixels in said second object frame;
   identifying accurate further motion vectors; and
   for each further motion vector identified as being accurate, assigning the value of its respective pixel to an additional enlarged target frame pixel location corresponding to an origination point of said further motion vector unless said additional enlarged target frame pixel location was previously assigned a pixel value.

7. A process for creating a high resolution copy of a target video frame selected from a sequence of video frames as set forth in claim 6, wherein said further motion vectors are estimated for substantially all pixels in said second object video frame.

8. A process for creating a high resolution copy of a target video frame selected from a sequence of video frames as set forth in claim 6, wherein said first object video frame is temporally closer to said target video frame than said second object video frame.

9. A process for creating a high resolution copy of a target video frame selected from a sequence of video frames as set forth in claim 6, wherein said first object video frame is positioned adjacent to a first side of said target video frame and said second object video frame is positioned adjacent to a second side of said target video frame.

10. A process for creating a high resolution copy of a target video frame selected from a sequence of video frames, each video frame including an odd field having pixel values in odd-numbered lines and an even field having pixel values in even-numbered lines, said process comprising the steps of:
    selecting a single field of said target video frame for resolution enhancement;
    defining a reference target frame having pixel values assigned from said selected single field;
    defining an enlarged target frame having pixel locations corresponding to said high resolution copy;
    assigning pixel values from said selected single field to pixel locations in said enlarged target frame which correspond to pixel locations in said selected single field;
    assigning estimated pixel values to unassigned pixel locations in said reference target frame;
    selecting a field from one of said video frames in said sequence of video frames which was not chosen as said selected single field as a first object field;
    estimating motion vectors extending from said reference target frame to pixels in said first object field;
    identifying accurate motion vectors;
    assigning the value of a respective pixel for each motion vector identified as accurate to an enlarged target frame pixel location corresponding to an origination point of said motion vector unless said enlarged target frame pixel location was previously assigned a pixel value; and
    printing said enlarged target frame.

11. A process for creating a high resolution copy of a target video frame selected from a sequence of video frames as set forth in claim 10, wherein said first object field precedes said selected single field.

12. A process for creating a high resolution copy of a target video frame selected from a sequence of video frames as set forth in claim 10, wherein said first object field follows said selected single field.

13. A process for creating a high resolution copy of a target video frame selected from a sequence of video frames as set forth in claim 10, wherein said first object field is the remaining field of said target video frame.

14. A process for creating a high resolution copy of a target video frame selected from a sequence of video frames as set forth in claim 10, further comprising the step of:

assigning the value of a respective pixel for each motion vector determined to be accurate and having an origination point positioned at the location of a previously estimated pixel value to a reference target frame pixel location which is the location of said origination point unless said reference target frame pixel location was previously assigned a pixel value from a respective pixel for an earlier motion vector determined to be accurate.

15. A process for creating a high resolution copy of a target video frame selected from a sequence of video frames as set forth in claim 10, wherein motion vectors are estimated for substantially all pixels in said first object field.

16. A process for creating a high resolution copy of a target video frame selected from a sequence of video frames as set forth in claim 10, further comprising the step of performing spatial edge enhancement to assign pixel values to unassigned pixel locations in said enlarged target frame prior to performing the step of printing said enlarged target frame.

17. A process for creating a high resolution copy of a target video frame selected from a sequence of video frames as set forth in claim 10, further comprising the steps of:

(a) selecting another object field from one of said video frames in said sequence of video frames which was not previously selected;
(b) estimating further motion vectors extending from said reference target frame to pixels in said another object field;
(c) identifying accurate further motion vectors; and
(d) for each further motion vector identified as being accurate, assigning the value of its respective pixel to an additional enlarged target frame pixel location corresponding to an origination point of said further motion vector unless said additional enlarged target frame pixel location was previously assigned a pixel value.

18. A process for creating a high resolution copy of a target video frame selected from a sequence of video frames as set forth in claim 17, further comprising the step of:

assigning the value of a respective pixel for each further motion vector identified as being accurate and having an origination point positioned at the pixel location of a previously estimated pixel value to an additional reference target frame pixel location which is the location of said origination point of said further motion vector unless said additional reference target frame pixel location was previously assigned a pixel value from a respective pixel for an earlier motion vector determined to be accurate.

19. A process for creating a high resolution copy of a target video frame selected from a sequence of video frames as set forth in claim 17, wherein said first object field is temporally closer to said first selected field than said another object field.

20. A process for creating a high resolution copy of a target video frame selected from a sequence of video frames as set forth in claim 17, wherein said first object field is positioned adjacent to a first side of said first selected field and said another object field is positioned adjacent to a second side of said selected first field.

21. A process for creating a high resolution copy of a target video frame selected from a sequence of video frames as set forth in claim 17 further comprising repeatedly performing steps (a) through (d) until a predetermined number of fields from said video frames in said sequence have been used to enhance said enlarged target frame.

22. A process for creating a high resolution copy of a target video frame selected from a sequence of video frames as set forth in claim 21, further comprising the step of performing spatial edge enhancement to assign pixel values to unassigned pixel locations in said enlarged target frame prior to performing the step of printing said enlarged target frame.

23. Printing apparatus for creating a high resolution copy of lower resolution video information comprising:

a monitor for viewing a sequence of video frames;
selector means for permitting an operator to select a target video frame from said sequence of video frames for resolution enhancement and subsequent printing;
processor means for defining an enlarged target frame having pixel locations corresponding to said high resolution copy, for assigning pixel values from said target video frame to pixel locations in said enlarged target frame which correspond to pixel locations in said target video frame, for selecting one of said sequence of video frames which was not selected as said target video frame as an object video frame for use in enhancing said enlarged target frame, for estimating motion vectors extending from said target video frame to pixels in said object video frame, for identifying accurate motion vectors, and for assigning for each motion vector identified as being accurate its respective pixel to an enlarged target frame pixel location corresponding to an origination point of said motion vector unless said enlarged target frame pixel location was previously assigned a pixel value; and
a printer for receiving pixel values for said enlarged target frame from said processor means and for generating a printed copy of said enlarged target frame.

* * * * *